United States Patent
Jaiyeoba et al.

(10) Patent No.: US 11,442,643 B2
(45) Date of Patent: Sep. 13, 2022

(54) SYSTEM AND METHOD FOR EFFICIENTLY CONVERTING LOW-LOCALITY DATA INTO HIGH-LOCALITY DATA

(71) Applicant: Samsung Electronics Co., Ltd., Suwon-si (KR)

(72) Inventors: Oluwole Jaiyeoba, Charlottesville, VA (US); Nima Elyasi, San Jose, CA (US); Changho Choi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/795,510

(22) Filed: Feb. 19, 2020

(65) Prior Publication Data

US 2021/0255792 A1  Aug. 19, 2021

Related U.S. Application Data

(60) Provisional application No. 62/976,296, filed on Feb. 13, 2020.

(51) Int. Cl.
*G06F 3/06* (2006.01)

(52) U.S. Cl.
CPC ............ *G06F 3/0644* (2013.01); *G06F 3/067* (2013.01); *G06F 3/0619* (2013.01); *G06F 3/0631* (2013.01); *G06F 3/0647* (2013.01); *G06F 3/0659* (2013.01); *G06F 3/0683* (2013.01)

(58) Field of Classification Search
CPC .... G06F 3/0644; G06F 3/0619; G06F 3/0631; G06F 3/0647; G06F 3/0659; G06F 3/067; G06F 3/0683
See application file for complete search history.

(56) References Cited

U.S. PATENT DOCUMENTS

| 8,756,404 B2 | 6/2014 | Luick |
| 10,200,875 B2 | 2/2019 | O'Shea |
| 10,356,150 B1 * | 7/2019 | Meyers ................. H04L 65/607 |

(Continued)

OTHER PUBLICATIONS

Chuang-Yi Gui, et al., "A Survey on Graph Processing Accelerators: Challenges and Opportunities", J. Comput. Sci. & Technol., Jan. 2019, arXiv:1902.10130v1 [cs.DC] Feb. 26, 2019.

(Continued)

*Primary Examiner* — Michelle T Bechtold
(74) *Attorney, Agent, or Firm* — Lewis Roca Rothgerber Christie LLP

(57) ABSTRACT

A system and method for processing unstructured source data is described. Input data having a range of V is loaded from off-chip storage to on-chip storage. The input data is partitioned into P temporary parent partitions via the on-chip storage, where a particular one of the P temporary parent partitions has a range of V/P. The P temporary parent partitions are stored from the on-chip storage to the off-chip storage. The P temporary parent partitions are partitioned for generating P temporary child partitions until the target number of T partitions is generated, where data from of the P temporary parent partitions is source data for recursively loading, partitioning, and storing the source data. An application is configured to access partitioned data from the T partitions for generating an output. The accesses of the partitioned data are sequential read accesses of the off-chip storage.

20 Claims, 10 Drawing Sheets

(56) References Cited

U.S. PATENT DOCUMENTS

| | | |
|---|---|---|
| 2002/0184357 A1 | 12/2002 | Traversat et al. |
| 2005/0055536 A1 | 3/2005 | Ansari |
| 2012/0303791 A1 | 11/2012 | Calder et al. |
| 2014/0108773 A1 | 4/2014 | Jagatheesan et al. |
| 2014/0188906 A1 | 7/2014 | Müller et al. |
| 2015/0052314 A1 | 2/2015 | Fujii et al. |
| 2016/0034190 A1 | 2/2016 | Lin et al. |
| 2016/0239528 A1* | 8/2016 | Pemberton ............ G06F 16/211 |
| 2016/0274970 A1* | 9/2016 | Earhart ................ G06F 3/0659 |
| 2017/0212680 A1* | 7/2017 | Waghulde ............ G06F 16/185 |
| 2017/0255552 A1 | 9/2017 | Chatterjee et al. |
| 2018/0285280 A1 | 10/2018 | Akin et al. |

OTHER PUBLICATIONS

U.S. Office Action dated Jan. 3, 2022, issued in U.S. Appl. No. 16/942,442 (7 pages).

U.S. Notice of Allowance dated Apr. 25, 2022, issued in U.S. Appl. No. 16/942,442 (7 pages).

* cited by examiner

SYSTEM AND METHOD FOR EFFICIENTLY CONVERTING LOW-LOCALITY DATA INTO HIGH-LOCALITY DATA

CROSS-REFERENCE TO RELATED APPLICATION(S)

The present application claims priority to and the benefit of U.S. Provisional Application No. 62/976,296, filed Feb. 13, 2020, entitled "A TECHNIQUE TO CONVERT LOW LOCALITY AND RANDOM MEMORY ACCESSES INTO SEQUENTIAL ACCESSES IN EFFICIENT TIME," the entire content of which is incorporated herein by reference.

FIELD

This application relates to accessing unstructured, low-locality data stored in an external storage device, and more particularly, to converting such data into high-locality data in an efficient manner.

BACKGROUND

One of the bottlenecks experienced by systems that process unstructured data is that such data may be stored in memory in a random manner. The data accesses to the stored data may therefore also be random. Unstructured data may be referred to as low-locality data because adjacent or neighboring entries within the data can have wide ranges between them.

When low-locality data is stored in an external and/or off-chip storage device, such as, for example, a dynamic random access memory (DRAM) or a flash solid state drive (SSD), random accesses to the data can create a bottleneck to applications processing the data. Examples of such applications include those that engage in large-scale data analytics, such as graph processing applications and machine learning kernels. The bottleneck experienced by such applications is often due to the fact that latency in accessing data on the external storage device is generally much higher than latencies experienced in computing data that is stored on-chip, for example, with an integrated processor. An example of such an on-chip memory can include a static random access memory (SRAM), and an example of such an integrated processor can include a field-programmable gate array (FPGA). When low-locality random data is accessed from the external storage and column-line data is retrieved each time, a relatively small portion of the data can be used due to the random manner in which the data is stored in the device, wasting a large portion of the bandwidth. The frequent visits to the external storage device and poor utilization of memory bandwidth can therefore create a bottleneck for the above-mentioned applications that process unstructured data.

Accordingly, what is needed are systems and methods to alleviate the adverse effects of random accesses to external storage for enhanced performance and scalability of applications utilizing unstructured data.

SUMMARY

Embodiments of the present disclosure are directed to a method for processing unstructured source data. A processor determines a target number of T partitions and loads input data from an off-chip storage device to an on-chip storage device. The input data has a range V. The input data is partitioned into P temporary parent partitions via the on-chip storage device, where a particular one of the P temporary parent partitions has a range of V/P. The P temporary parent partitions are stored from the on-chip storage device to the off-chip storage device. The P temporary parent partitions are partitioned for generating P temporary child partitions until the target number of T partitions is generated. In one embodiment, data from the P temporary parent partitions is source data for recursively loading, partitioning, and storing the source data. An application is configured to access partitioned data from the T partitions for generating an output. The accesses of the partitioned data are sequential read accesses of the off-chip storage device. In one embodiment, T, V, and P are numerical values greater than 0.

According to one embodiment, T is based on a storage capacity of the on-chip storage device, wherein a range of the partitioned data in a particular one of the generated T partitions is within the storage capacity of the on-chip device.

According to one embodiment, the input data for a first level of partitioning is the source data, wherein the source data has a range of R, wherein the range of the partitioned data in a particular one of the generated T partitions is R/T.

According to one embodiment, the partitioned data has higher locality than locality of the source data.

According to one embodiment, the loading of the input data is in batches via a sequential read operation of the off-chip storage device, and the storing of the P temporary parent partitions is via a sequential write operation of the off-chip storage device.

According to one embodiment, fixed memory space is allocated in the off-chip storage device, wherein all partitions generated at a particular recursion step are stored in the fixed memory space.

According to one embodiment, the storing of the P temporary child partitions includes invoking a data storage process including: dynamically allocating a data block of a fixed size, wherein the data block stores a portion of a first one of the P temporary child partitions from a given parent partition and a portion of a corresponding first one of the P temporary child partitions from a next neighboring parent for maximizing use of storage space of the data block.

According to one embodiment, a portion of the partitioned data accessed from the off-chip storage device is stored on the on-chip storage device, the method further comprising: accessing the partitioned data on the on-chip storage device via a random data access.

According to one embodiment, the on-chip storage device is a static random access memory, and the off-chip storage device is a dynamic random access memory or a solid state drive.

According to one embodiment, the unstructured source data is graph data, and the application is a graph processing application.

Embodiments of the present disclosure are also directed to a system for processing unstructured source data. The system comprises an off-chip storage device, an on-chip storage device, and a processor coupled to the on-chip and off-chip storage devices. The processor is configured to: determine a target number of T partitions; load input data from the off-chip storage device to the on-chip storage device, the input data having a range V; partition the input data into P temporary parent partitions via the on-chip storage device, wherein a particular one of the P temporary parent partitions has a range of V/P; store the P temporary parent partitions from the on-chip storage device to the off-chip storage device; and partition the P temporary parent partitions for generating P temporary child partitions until the target number of T partitions is generated, wherein data from the P temporary parent partitions is source data for recursively loading, partitioning, and storing the source data, wherein an application is configured to access partitioned data from the T partitions for generating an output, wherein the access of the partitioned data is a sequential read access of the off-chip storage device, and wherein T, V, and P are numerical values greater than 0.

DETAILED DESCRIPTION

Figure 1:
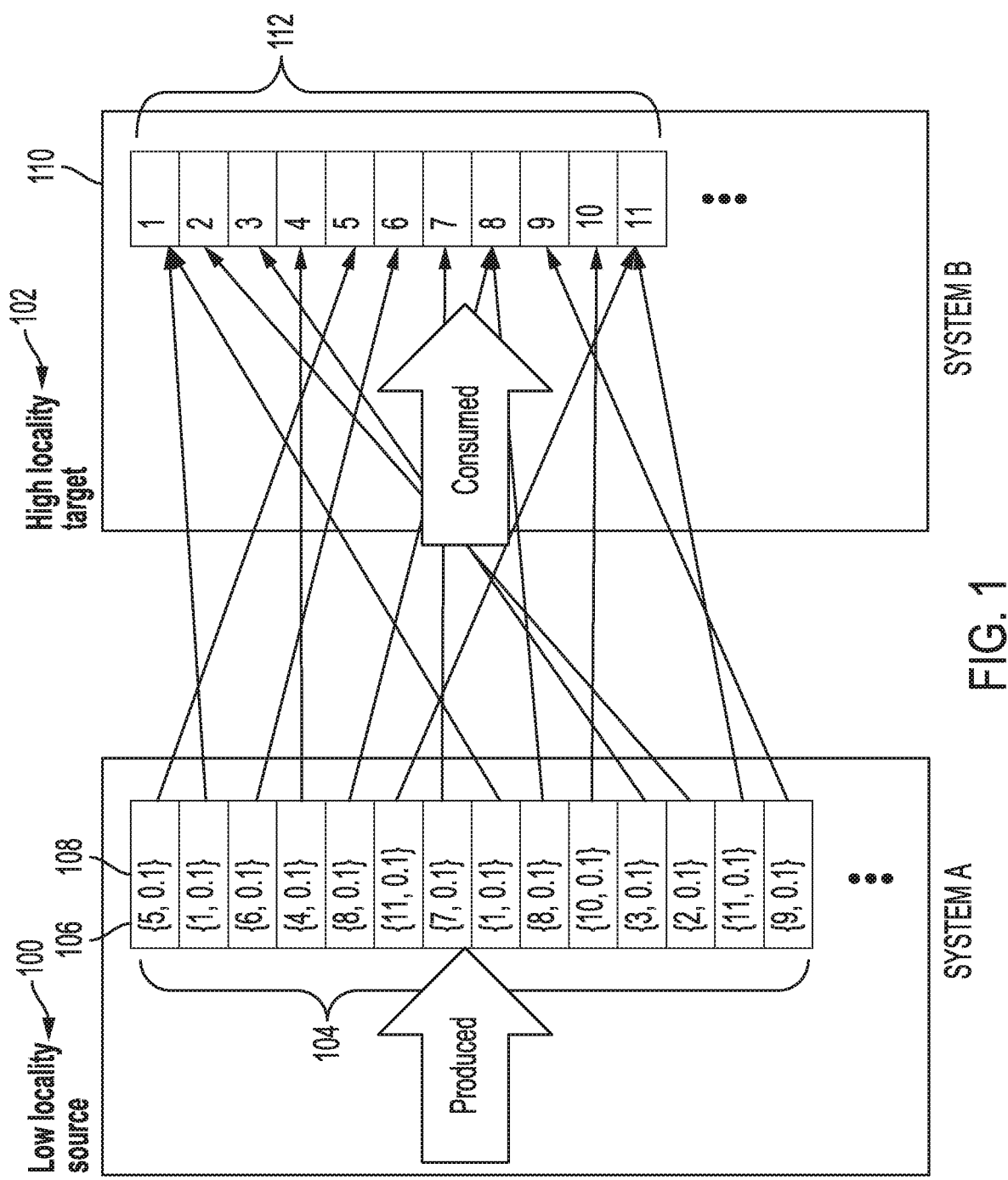
FIG. 1 is a conceptual block diagram of a source system producing data for access by a target system.

Various techniques can be used address the issue of random data access patterns to alleviate the bottlenecks created by random data accesses. One such technique, referred to as a Sort-First technique, includes employing a high-speed sorting algorithm, such as the MergeSort algorithm, to first sort the generated low-locality random data into a high-locality (e.g. sorted, cache friendly) data so that subsequent processing of the data can enjoy from sequential access patterns. High-locality data thus implies that adjacent or neighboring entries within the data are within close ranges of each other. One feature of such a technique is that computationally expensive random accesses can be traded with multiple sequential accesses to stored data to improve performance. Because sequential data access patterns to memory may perform better than random accesses, there may be an increase in overall performance. The MergeSort algorithm can be used in connection with FPGA platforms, Further, implementation in FPGAs can remove any random access to off-chip memory (e.g. DRAM or SSD), thereby maximizing the ultra-low latency privilege of on-chip memory (e.g. SRAM). This makes efficiently implemented MergeSort on FPGA have low overhead, and performance gain can be achieved.

Despite its benefits, the Sort-First technique using Merge-Sort, however, still suffer a number of issues. First, with the Sort-First technique, the data is sorted before high-locality data accesses can commence. This means a minimum of log(N) passes are made through the entire data for accomplishing the complete sort. This number can be high especially when dealing with large data sizes such as those in graph processing domains. Thus, a technique using a lower number of passes through the input data can result in better performance.

Second, the dependency between neighboring internally sorted chunks using the MergeSort strategy can cause frequent visits to external storage when dealing with large data sizes (i.e. data too large to fit into a system's available DRAM). MergeSort can operate by successively 'merging' neighboring internally sorted chunks into larger chunks until the entire data is completely sorted. In cases where the data is too large to fit into the DRAM, this may require extra access calls to an external SSD beyond a theoretical number, potentially resulting in drawbacks in performance.

Embodiments of the present disclosure provide a technique for converting relatively large-size and low-locality data stored in an external storage device, into high-locality data efficiently in time and using limited space. The low-locality input data can be random input data (e.g. random key-value pairs), workloads from an application context (e.g. graph processing workloads), and/or the like. In one embodiment, the low-locality data can be converted into high-locality data by partitioning the original data in the external storage device in an iterative manner until a particular granularity is achieved. In one embodiment, the partitioning occurs on-chip, via an integrated processor. Also, in one embodiment, the partitioning scheme does not require that the resulting data be completely sorted. Because the original input data need not be completely sorted, less sequential passes are made to the input data in the external storage device, providing improved performance over prior techniques that completely sort the data.

In one embodiment, a data representation scheme is used to store the partitioned data at each iteration of the partitioning process that ensures that the partitioned data that is generated at each level/iteration, is stored using a same fixed space. According to one embodiment, the partitioned data is stored in a way that maximum data packing is achieved for each data block that is allocated for doing the storing. Thus, irrespective of the number of iterations and partitions that are generated, a same memory space is used for storing the partitioned data.

The storing of higher locality data in the external storage device as partitions of the original input data helps accelerate random access patterns in several processing contexts that deal with unstructured data. Accordingly, the locality of memory/storage accesses are improved without attempting to provide perfect sorting of the data. When the partitioned data is accessed from the external storage device, such access is sequential, allowing saturation of memory bandwidth. Thus, an embodiment of the disclosure provides time efficiencies by reducing the random accesses to the external storage device which are computationally expensive, and trading them off with a few sequential passes to the input data. Because sequential accesses can be more efficient than random accesses, superior performance is achieved. The high-locality data outputs that are available as partitions can further have much lower latency SRAM processing.

FIG. 1 is a conceptual block diagram of a source system 100 producing data for access by a target system 102 which exemplifies one problem of random access patterns. In the embodiment of FIG. 1, the source system 100 generates data that is unsorted 104. The unsorted data 104 may be, for example, random key-value pairs or workloads from an application context (e.g. graph processing workloads). In a graph processing context, the source system 100 may be nodes of a graph (e.g. node 106), where each node generates a value (e.g. value 108) that is intended to be consumed/committed by nodes of the target system 102 (e.g. node 110). As depicted in the example of FIG. 1, the source data 104 is random and unsorted data (low-locality data) while the destination data 112 is sequential. The consumption/commitment of the source data 104 to the destination data 112 involves random access patterns. For example, the committing of data to the target system 102 may be based on a function such as, for example, a breadth-first-search function that access data in a sequential order. Because the data in the source system 100 is unsorted, access to the data in the high-locality target suffers from random data access patterns which hurt performance of the target system 102.

In one embodiment, the random-access-pattern problem discussed with respect to FIG. 1 is addressed via a system and method that transforms low-locality data into high-locality data in efficient time and using limited space. The methodology performed by the system and method is referred to as ACTS.

Figure 2:
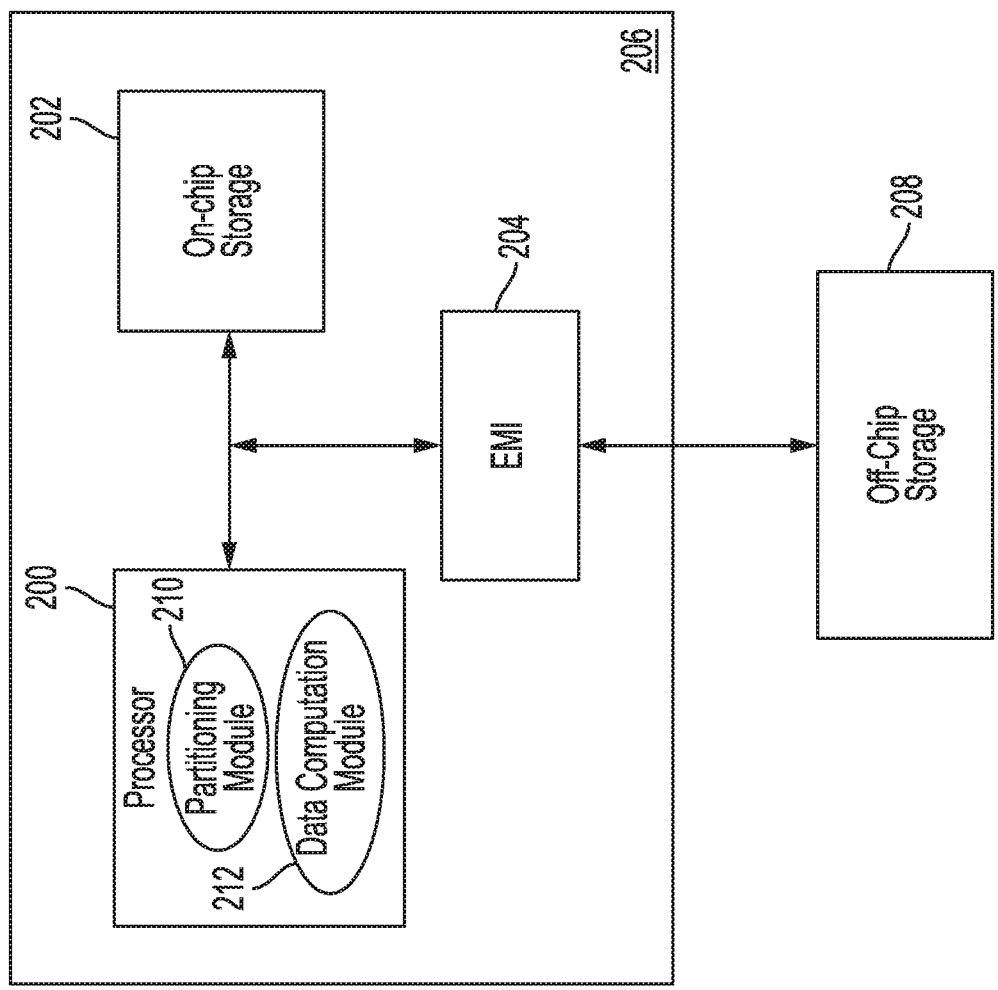
FIG. 2 is a block diagram of a system configured with low-locality data conversion methodology according to an exemplary embodiment.

FIG. 2 is a block diagram of a system configured with the low-locality data conversion methodology according to an exemplary embodiment. The system may include a processor 200 coupled to an on-chip storage device 202 and an external memory interface (EMI) 204. In one embodiment, the processor 200, on-chip storage device 202, and EMI 204, are contained in a single integrated circuit chip 206. The EMI 204 is further coupled to an off-chip/external storage device 208.

The processor 200 may be any processor configured with a processing circuit hardware, such as, for example, a central processing unit (CPU) core, field-programmable gate array (FPGA), or the like. The on-chip storage device 202 may be, for example, an SRAM. The off-chip storage device 208 may be, for example, a DRAM or SSD. The EMI 204 may be a bus configured with an appropriate bus protocol for communicating between the integrated circuit chip 206 and the external storage device 208.

In one embodiment, the processor 200 may be configured to execute a partitioning module 210 for loading and partitioning the data stored in the off-chip storage device 208, and compactly re-loading the partitioned data back into the off-chip storage device. In this regard, the partitioning module 210 can be configured with instructions that cause the processor to load batches of source data from the off-chip storage device 208, into the on-chip storage device 202. Each loaded batch is partitioned into P (e.g., 2) temporary partitions. The number of P temporary partitions generated from each loaded batch may be referred to a partition fan-out. The P temporary partitions can be loaded back into the off-chip storage device 208, for completing a first level of partitioning. In one embodiment, the partitions are loaded back into the off-chip storage device 208 in a manner that maximizes an allotted memory space.

In one embodiment, each child partition generated from the first level becomes the input source data (and hence, acts as a parent) for a second level of partitioning, where such input source data is loaded from the off-chip storage device 208 to the on-chip storage device 202, partitioned, and stored back into the off-chip storage device. In one embodiment, the partitioning module engages in tree-like recursive partitions of each parent partition to generate a child partition, until a target number of partitions is attained. In one embodiment, the target number of partitions is based on a storage capacity of the on-chip storage device 202. More specifically, the partitioning module 210 partitions the data in the off-chip storage device 208 until a range of keys in each partition is within the capacity of the on-chip storage device 202. In this manner, instead of performing complete sorting of the data in the off-chip storage device, the data is partitioned to a level of granularity that aligns with the capacity of the on-chip storage device 202. This results in a fewer number of passes through the input source when compared to traditional mechanisms, such as the Sort-First technique, that completely sorts the input data. Any random access occurs on the on-chip storage device 202, making such accesses faster and more efficient than random accesses to the off-chip storage device 208.

In one embodiment, the processor may also be configured to execute a data computation module 212 for making computations at substantially the same time partitioning is taking place. For example, the data computation module 212 may include a graph processing module 212 configured to execute a vertex function using the partitioned data. Embodiments of the present disclosure help accelerate such computations by avoiding high latency random accesses to the off-chip storage device. For example, embodiments of the present disclosure may expedite graph analysis of social networks for detecting terrorist networks, expedite graph analysis of power grids for optimizing power distribution, and/or the like.

Although the partitioning module 210 is described as being a separate functional unit from the data computation module 212, a person of skill in the art will recognize that the functionality of the modules may be combined or integrated into a single module, or further subdivided into further sub-modules without departing from the spirit and scope of the inventive concept. For example, the function of the partitioning module 210 may be performed by the data computation module 212 while executing a vertex function, allowing the graph workload to be computed and partitioned at the same time.

Figure 3:
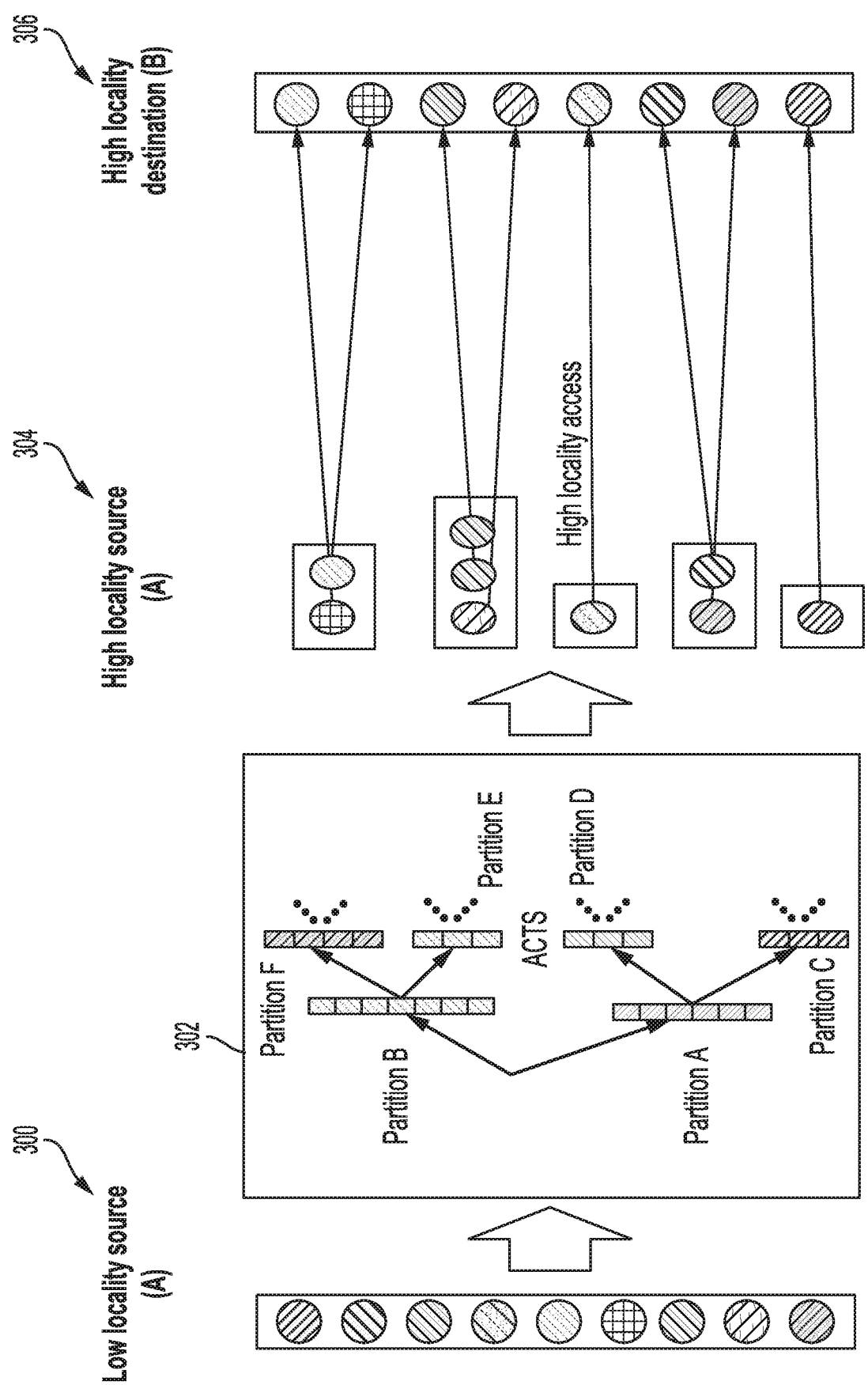
FIG. 3 is a conceptual block diagram of partitions that are generated in response to applying a low-locality data conversion methodology to input source data according to one exemplary embodiment.

FIG. 3 is a conceptual block diagram of partitions that are generated in response to applying the low-locality data conversion methodology to input source data according to one exemplary embodiment. Low-locality data 300 stored in the off-chip device 208 is processed via the low-locality data conversion methodology 302 to transform the low-locality data to high-locality data 304. The high-locality data is then stored back into the off-chip device. A high-locality destination 306 that is determined, for example, by the data computation module 212, may now consume the high-locality data via sequential accesses to the off-chip storage device, maximizing available bandwidth of the off-chip device and improving performance of the data computation module. In one embodiment, random accesses to the off-chip device can be reduced and/or eliminated. Instead, any random access of the data (e.g., due to the fact that the data in the partitions themselves may not be completely sorted) can occur on the on-chip storage device 202 after the data in the off-chip storage device is sequentially accessed and loaded to the on-chip storage device. Such sequential access may occur during a computation function by the data computation module 212. Thus, lower latency of the on-chip storage device can be leveraged and maximized in the event that random accesses to the data is needed. Performance of the system can be therefore dependent, according to one embodiment, on the bandwidth of the off-chip storage device, allowing large internal bandwidth provided by memory-centric architectures, to be exploited.

Figure 4:
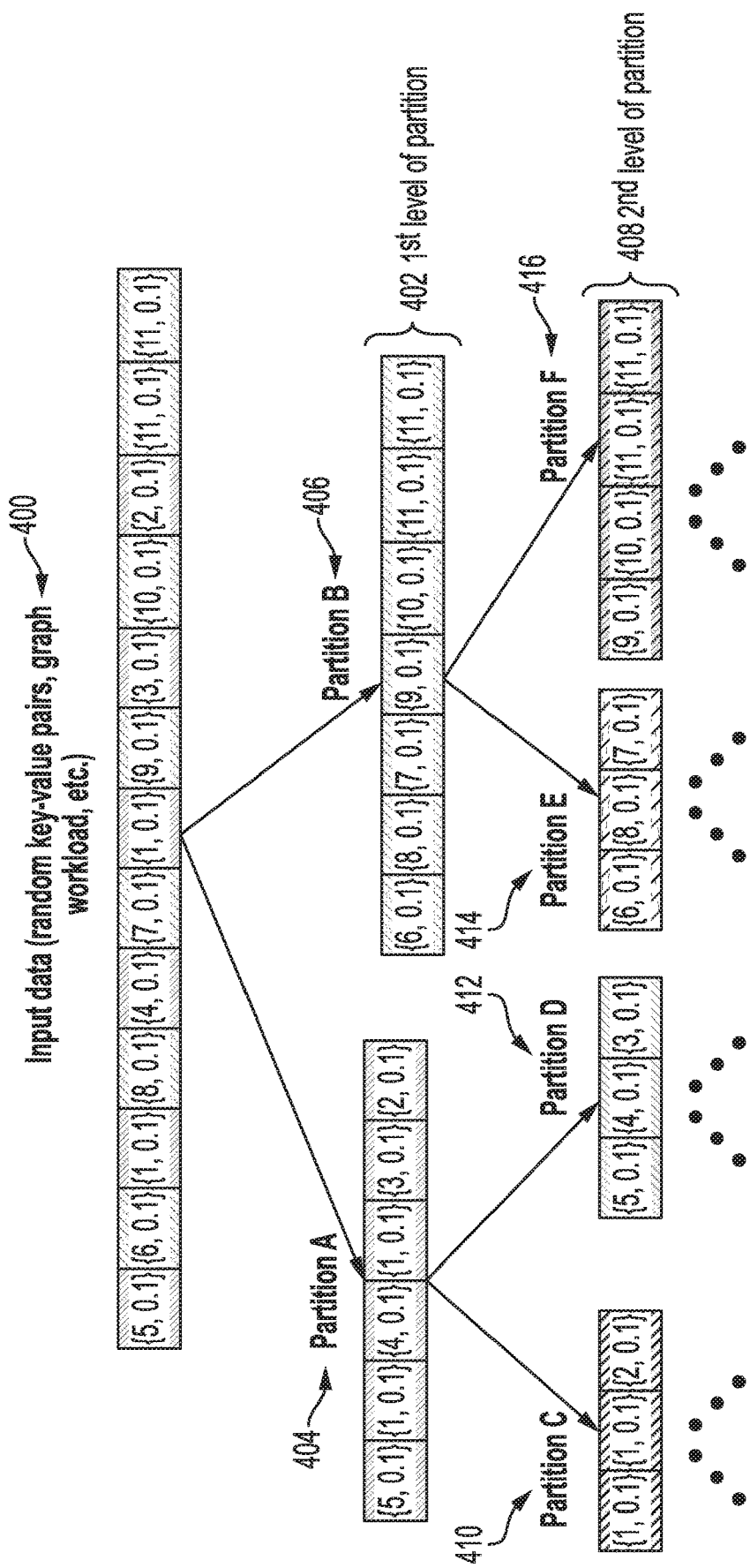
FIG. 4 is a conceptual layout diagram of tree-like recursive partitions generated by a low-locality data conversion methodology according to one exemplary embodiment.

FIG. 4 is a conceptual layout diagram of the tree-like recursive partitions generated by the low-locality data conversion methodology according to one exemplary embodiment. The partitioning starts with the original input source data 400, which may be unstructured data taking the form of random key-value pairs. In the example of FIG. 4, the lowest key of the input source data is 1, and the highest key is 11. Hence, the input source data 400 has a range of 10.

During a first level of partitioning 402, the input source data 400 is partitioned into partition A 404 and partition B 406. In one embodiment, the range of each partition is calculated as follows:

range of partition=range ($V$) of the input batch/partitioning fan-out ($P$)

Using the above formula for the example of FIG. 4, each partition 404, 406 in the first partition level 402 has a range of 10/2=5. In this regard, when the source data 400 is read from the off-chip storage device 208, it is buffered into the right partition of the on-chip storage device 202 (partition A 404 or partition B 406), depending on whether the key is smaller, in which case it is written to partition A 404, or bigger, in which case it is written to partition B 406. Thus, in the example of FIG. 4, the data in partition A has key values between 1 and 5 only, while the data in partition B has key values between 6 and 11 only. In one embodiment, during each level of partitioning, the partitioned data that results from the current level of partitioning has higher locality than the data resulting in a prior level of partitioning.

In one embodiment, the first level of partitioning 402 calls for a single sequential read and write pass to the original input source 400 to create P (e.g. 2) child partitions. In one embodiment, the block size of a write pass is aligned to one I/O block size in the off-chip storage device 208. This helps provide maximal utilization of available bandwidth of the external storage.

Another single sequential read and write pass may occur during a second level of partitioning 408 to generate partitions C 410 and D 412 from parent partition A 404, and partitions E 414 and F 416 from parent partition B 406. Thus, after the second level of partitioning is completed, one more exponent number of partitions ($P^2=2^2$) is generated. A series of additional recursive partitioning is performed until a target T number of partitions is obtained. In one embodiment, the target T number of partitions is determined based on the capacity of the on-chip storage device, and fed to the low-locality data conversion methodology as an input parameter along with the fan-out value P.

In one embodiment, the low-locality data conversion methodology incorporates a data storage technique for effectively storing the partitions in both the on-chip and off-chip memories 202, 208. In one embodiment, the data storage technique allows dynamic memory allocation and tight packing of data in storage to not only maximize storage use, but to also improve performance. For example, the data storage technique applied for on-chip storage helps support a higher fan-out number P, which translates to better performance given that the higher fan-out number, the shorter the number of passes through the input data before the target T number of partitions are generated.

Figure 5:
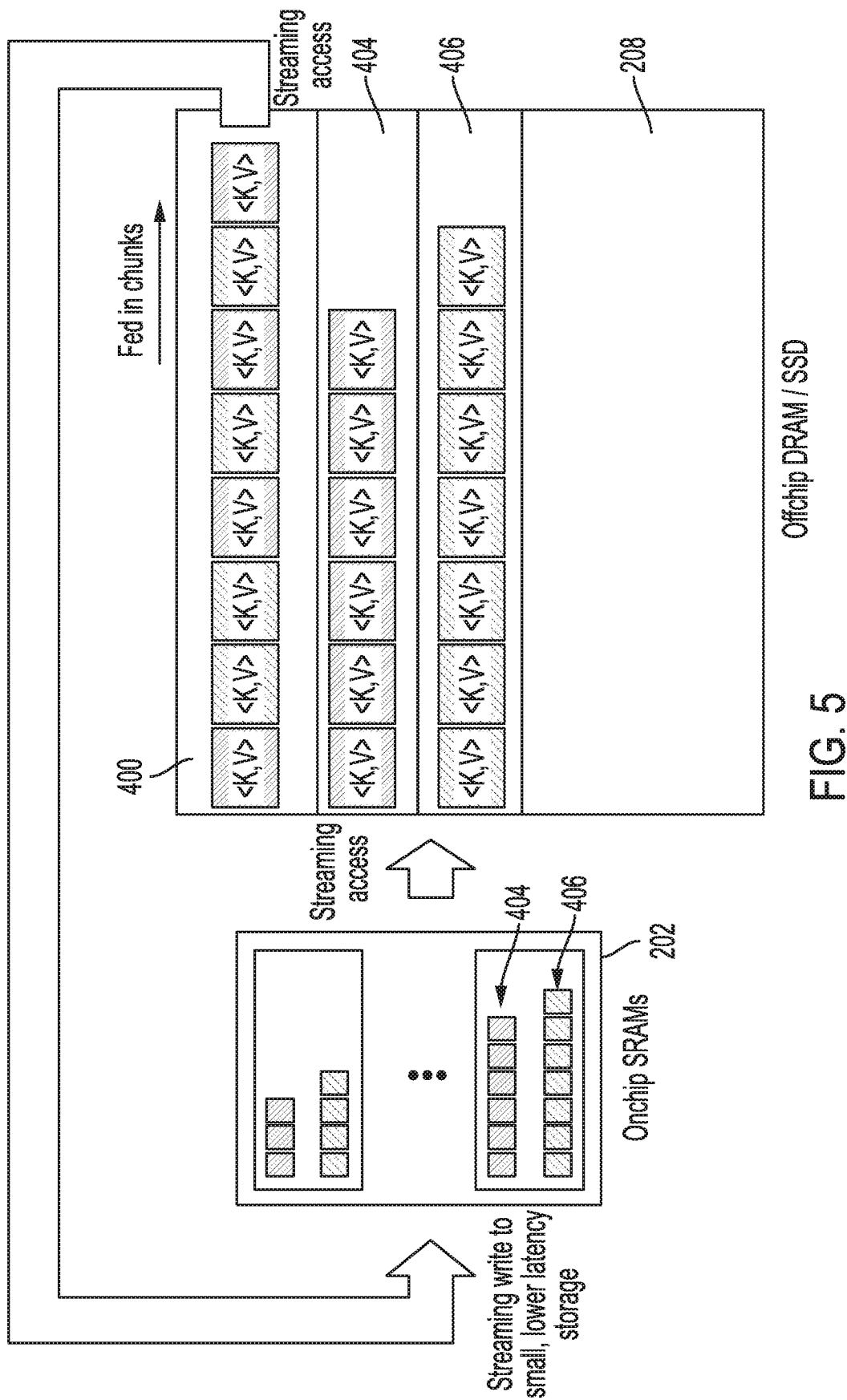
FIG. 5 is a conceptual layout diagram of a process for creating partitions by a partitioning module according to one exemplary embodiment.

FIG. 5 is a conceptual layout diagram of a process for creating partitions by the partitioning module 210 according to one exemplary embodiment. The process starts, and a batch of the input source data 400 stored in the off-chip storage device 208 is accessed and streamed in chunks to the on-chip storage device 202. In one embodiment, this is a sequential read operation from the off-chip storage device 208.

The partitioning module 210 partitions the loaded batch into P temporary partitions according to a partition function $f(P)$ that is defined, for example, by a user. Assuming that P is set to 2, two partitions are generated (e.g. partition A 404 and partition B 406), and the results of the partitioning is buffered in the on-chip storage device 202. In one embodiment, the partitioning operation $f(P)$ uses a single processor clock cycle due to the low-latency of the on-chip storage device 202.

The generated temporary partitions 404, 406 can be streamed back to the off-chip storage device 208, and can be stored in an allocated space of the off-chip storage device. The process continues for each chunk in the current batch until the chunks are loaded, partitioned, and stored back to the off-chip storage device 208, for completing a first level of partitioning. In one embodiment, the storing back of the chunks into the off-chip storage device invokes a sequential write operation. In one embodiment, the block size of each write operation can be aligned to one I/O block size in the off-chip storage device, allowing maximum utilization of available bandwidth of the external storage.

In one embodiment, the partitioning module 210 can be configured to invoke a data storage technique for tightly packing the data in memory for maximizing storage space and improving performance. The storing of data in the on-chip and off-chip memory devices 202 occurs during every level of partitioning. The data storage technique according to one embodiment uses a data representation scheme that helps ensure that data in every level of partitioning is stored using the same space in memory. As a person of skill in the art will recognize, the generated partitions may contain more or less data depending on real world workloads. That is, during partitioning, some partitions may contain more or less data than others. Therefore, representing destination partitions as a fixed array in the off-chip storage device 208 may be inefficient and cause data overflow in memory.

In one embodiment, the data storage technique employed by the low-locality data conversion methodology is configured to provide data packing efficiency. When dealing with large sized data, the partitioning module may generate numerous partitions. Consequently, additional different partitions may be generated at different partition levels, and inefficiencies in packing partitions together may also exponentially increase at each respective level. In one embodiment, the data storage technique is configured to completely and tightly pack data in storage so that regardless of the level or number of partitions, a same memory size is sufficient to store the partitioned data.

In one embodiment, the data storage technique employed by the low-locality data conversion methodology is also configured to improve performance of generating partitions. One parameter that may affect such performance is the partitioning fan-out (P) parameter. The more partitions generated at each level (the higher the value of P), the lesser the number of passes through the input source to generate the required (T) number of partitions. In one embodiment, the number of partition levels, and hence, the number of passes through the input data, as computed as $\log_p(T)$. For example, if P is 16 and T is 65,536, the partitioning module 256 makes four (4) passes through the input data to achieve 65,536 partitions. If P, however, is 256, the partitioning module 210 only makes two (2) passes to generate the same number of target (65,536) partitions. Representing on-chip (e.g., SRAM) sub-partitions with many fixed-sized arrays would lead to overflow of the on-chip storage device 202 due to limitations of on-chip memory. However, by representing the on-chip sub-partitions via the data storage technique of an embodiment of the present disclosure, many sub-partitions (i.e., a relatively large value of P) can be represented using the limited on-chip resource, enabling an overall improvement in performance.

Figure 6:
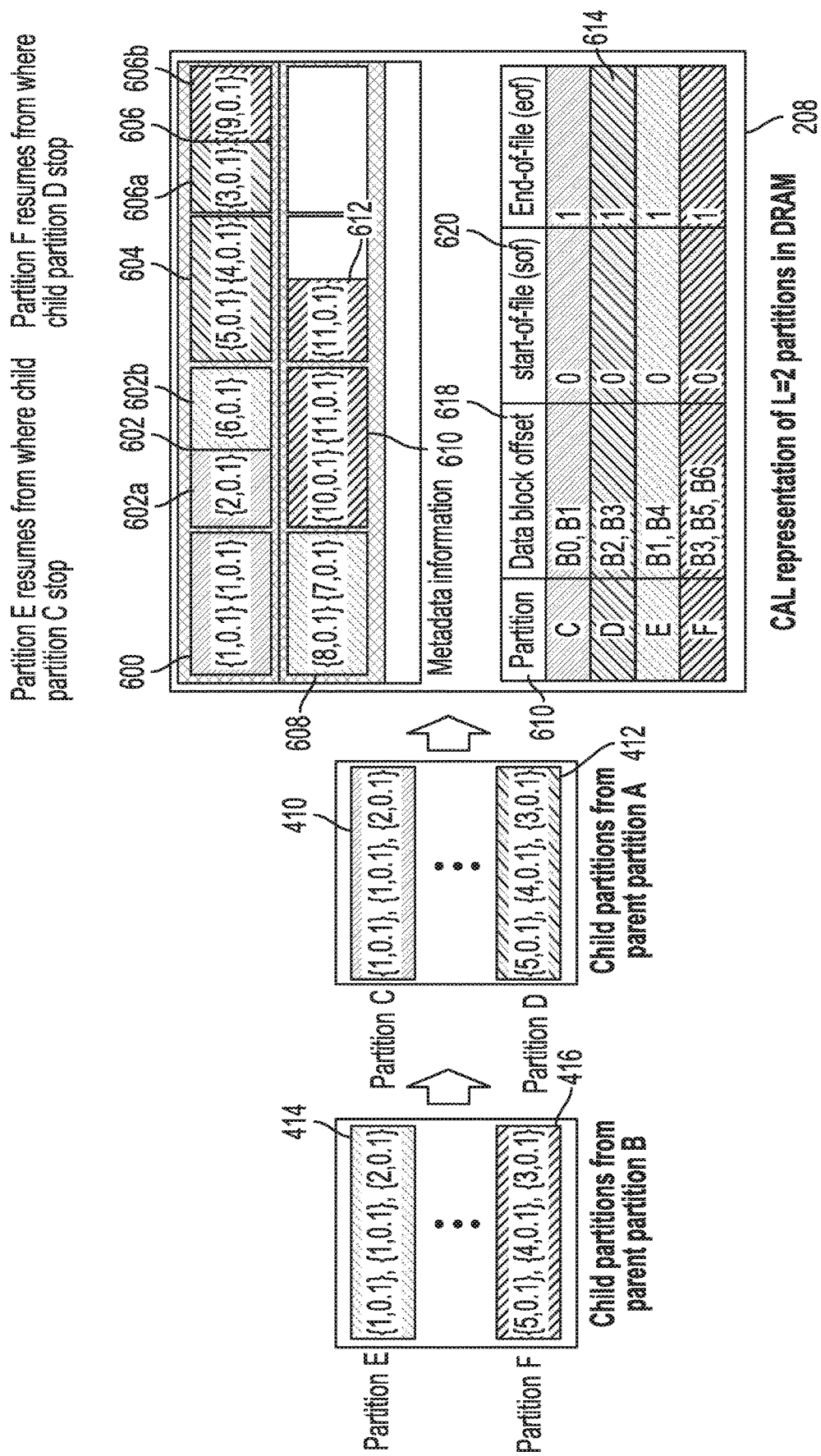
FIG. 6 is a conceptual layout diagram of a process for packing data onto an off-chip storage device according to one exemplary embodiment.

FIG. 6 is a conceptual layout diagram of a process for packing data onto the off-chip storage device 208 according to one exemplary embodiment. The same process may also be used for packing data in the on-chip storage device 202. Also, although the data storage technique is described as being implemented by the partitioning module 210, a person of skill in the art will recognize that it may be implemented via a separate module dedicated to do the data packing in response to commands by the partitioning module 210.

In the example of FIG. 6, the partitioning module 210 generates, during a second level of partitioning, child partitions C-F 410-416 from parent partitions A 404 and B 406. In one embodiment, the partitioning module is configured to store the child partitions 410-416 in an allocated space of the off-chip storage device 208, so that no empty space is left behind. In this regard, data blocks 600-612 (e.g., fixed-width array spaces in storage), can be allocated dynamically to store growing partitions data. In one embodiment, a partition is stored as a linked-list of dynamically allocated data blocks. Whenever data belonging to a partition is to be stored in storage, and the available space allocated for it is filled up (e.g. block 600 for partition C), another data block (e.g. block 602) is allocated for it and linked to the last data block (e.g. block 600) associated with that partition.

In one embodiment, the partitioning module 210 stores metadata information 614 for keeping track of which data blocks belong to which partitions. In this regard, the metadata information 614 can include, for each partition identified via a partition identifier 616, a data block offset 614 identifying the blocks where the partitions are stored. A start-of-file 616 and end-of-file 618 identifies, for each partition, locations within the identified blocks where the partition's data is located.

In one embodiment, partitioning an NB number of key-value pairs uses (1/D)th (i.e. NB/D) metadata space (where D is data block size). If NB=1,000,000 key-values (kvs), D=10,000 key-values, $\frac{1}{10000}^{th}$ (i.e. 10,000 kvs) is used for metadata space. If NB=1,000,000,000 key-values, D=10,000 key-values, $\frac{1}{10000}^{th}$ (i.e. 1000 kvs) is used for metadata space.

In one embodiment, when the child partitions 410-416 are stored in the data storage device, the data storage technique causes their data to be stored from where corresponding child partitions in preceding parent's stop. The corresponding child partitions may be preset as desired. For example, assume that partition Pi1 (e.g., partition C) is the first child partition of parent Pi (e.g., parent partition A), and partition P(i+1)1 (e.g., partition E) is the first child partition of parent P(i+1) (e.g., parent partition B). Also assume that partition Pi2 (e.g., partition D) is the second child of partition Pi (e.g., parent partition A) while partition P(i+1)2 (e.g., partition F) is the second child of partition P(i+1) (e.g., parent partition B). In one example, the data storage technique may be configured so that partition P(i+1)1 (e.g., partition E) starts storing its data where partition Pi1 (e.g., partition C) ends, and partition P(1+1)2 (e.g., partition F) starts storing its data from where partition Pi2 (e.g., partition D) ends. In this manner, tight coupling of all corresponding child partitions in a partitioning level may be achieved while allowing an arbitrary number of child partitions to be stored using a same (fixed-width) space (work volume). Of course, a person of skill in the art should recognize that other types of corresponding child partition configurations are also possible.

In the example of FIG. 6, the partitioning module 210 begins by storing partition C data in dynamically-allocated blocks 600 and 602. Only a portion 602a of block 602 is filled with partition C data. The partitioning module 210 then proceeds to store partition D data in dynamically allocated blocks 604, 606. Accordingly, a portion 606a of block 606 is filled with partition D data.

In the example of FIG. 6, the partitioning module 210 then proceeds to store the partition E data in the storage device. In doing so, the partitioning module 210 first maximizes usage of block 602 by storing a portion of partition E data into portion 602b before allocating another data block 608 to store the remaining partition E data. Similarly, when partition F data is stored in the storage device, the partitioning module 210 first maximizes usage of block 606 by storing a portion of partition F data into portion 606b before dynamically allocating blocks 610 and 612 to store the remaining partition F data.

In one embodiment, the partitioning module 210 is further configured with a memory management technique that further provides space efficiency in creating the partitions. In one embodiment, the partitions are generated using two work spaces/volumes in the off-chip storage device 208 of equal, fixed size.

Figure 7:
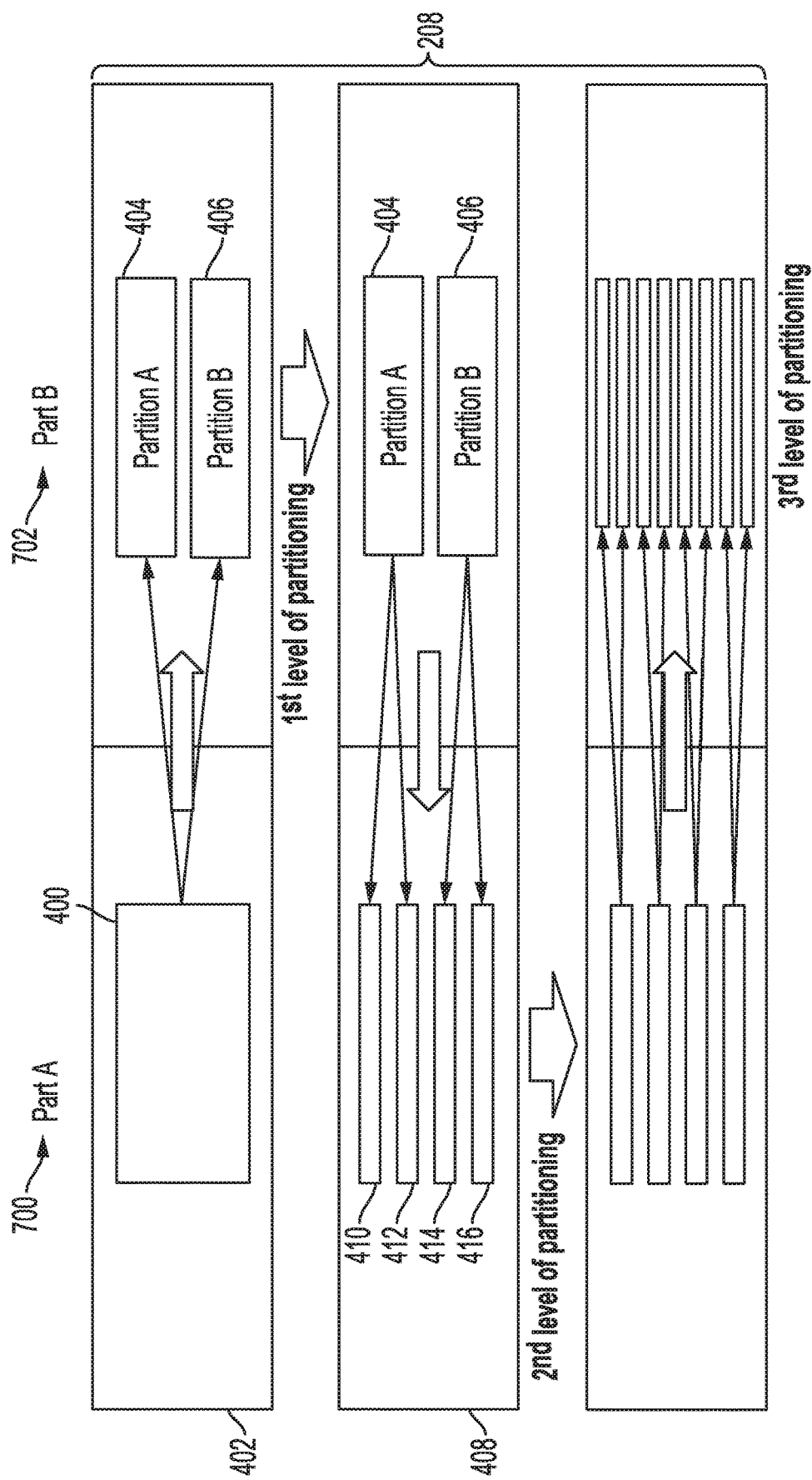
FIG. 7 is a layout block diagram of two work volumes of an off-chip storage device that are alternately used during each level of partitioning according to one exemplary embodiment.

FIG. 7 is a layout block diagram of two work volumes 700, 702 of the off-chip storage device 208 that are alternately used during each level of partitioning according to one exemplary embodiment. In one embodiment, during the first level of partitioning 402, data in work volume 700 stores the original source data 400. In this regard, during the first level of partitioning 402, work volume 700 can be referred to as the source work volume. The partitioning module 210 can use the source data 400 in the source work volume 700 to load and partition the data, into two destination partitions (partition A 440 and partition B 406). Once partitioned, partitions A and B are stored in work volume 702, which may be referred to as a destination work volume during the first level of partitioning.

During the second level of partitioning 408, each partition generated in level 1 (e.g. partitions A and B) stored in work volume 702, now becomes the source data that is loaded and partitioned into partitions 410-416. Because the source data (partitions A and B) are stored in work volume 702, data in work volume 700 may no longer be useful. Thus, during the second level of partitioning, work volume 702 is the source work volume, and work volume 700 is the destination work volume. The partitions 410-416 generated during the second level of partitioning are stored in the destination work volume 700, over-writing the original source data 400.

As further levels of partitioning occur, work volumes 700 and 702 swap roles as source and destination work volumes, until the target number of partitions is generated. The swapping of work volumes as source and destination volumes helps provide space efficiency such that, in one embodiment, only 2×NB (where NB is the size of the input batch) is needed by the low-locality data conversion methodology to produce the target number of partitions (T). In addition, due to the data packing technique used by the low-locality data conversion methodology, maximum space packing of partitions is provided such that each work volume 700, 702 may be sufficient regardless of the number of partitions to be stored at every level.

Figure 8A:
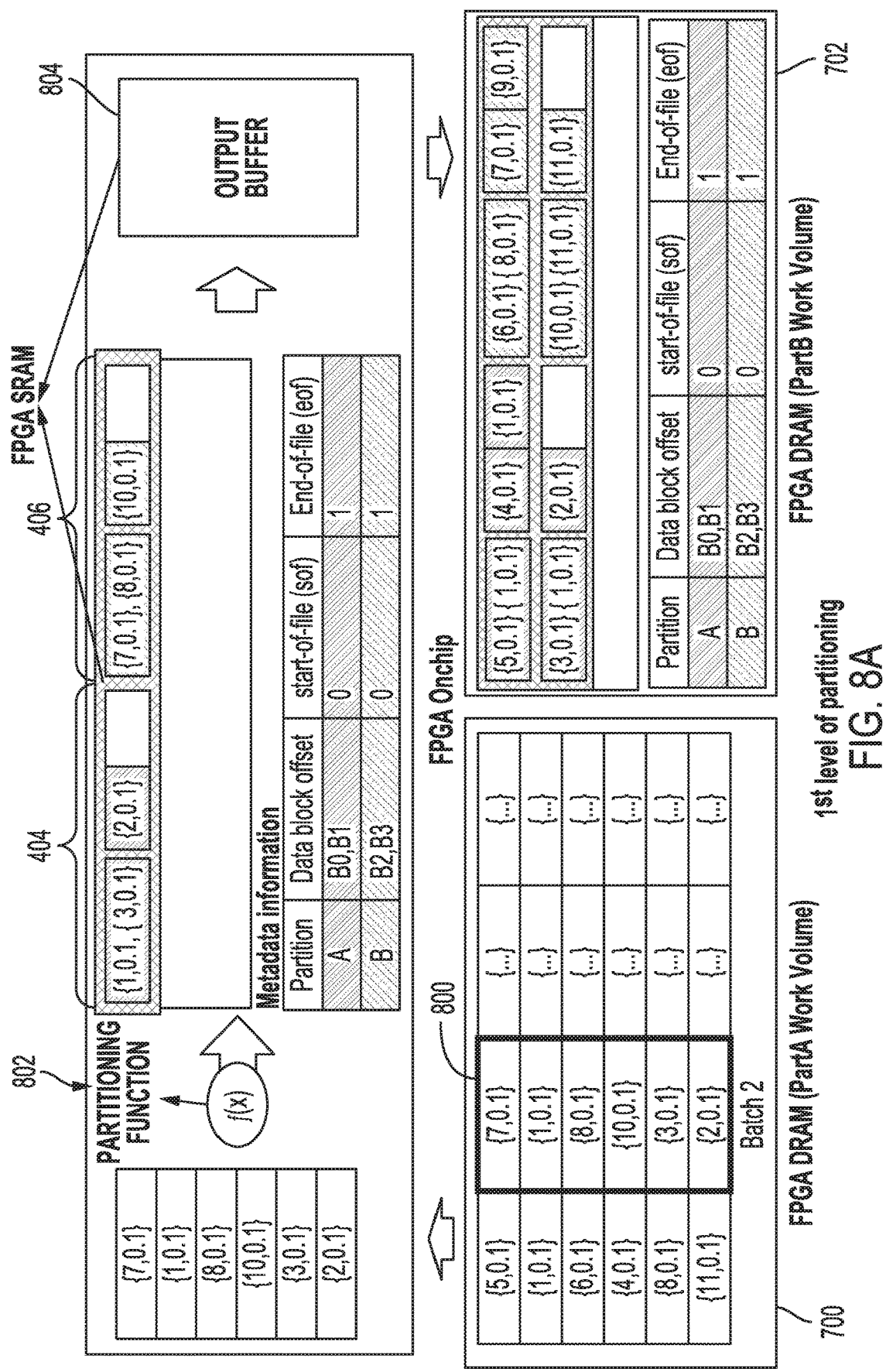
FIGS. 8A and 8B are conceptual layout diagrams of a process of using the two work volumes of FIG. 7 in alternating manner to generate partitions at each level of partitioning, according to one exemplary embodiment.
Figure 8B:
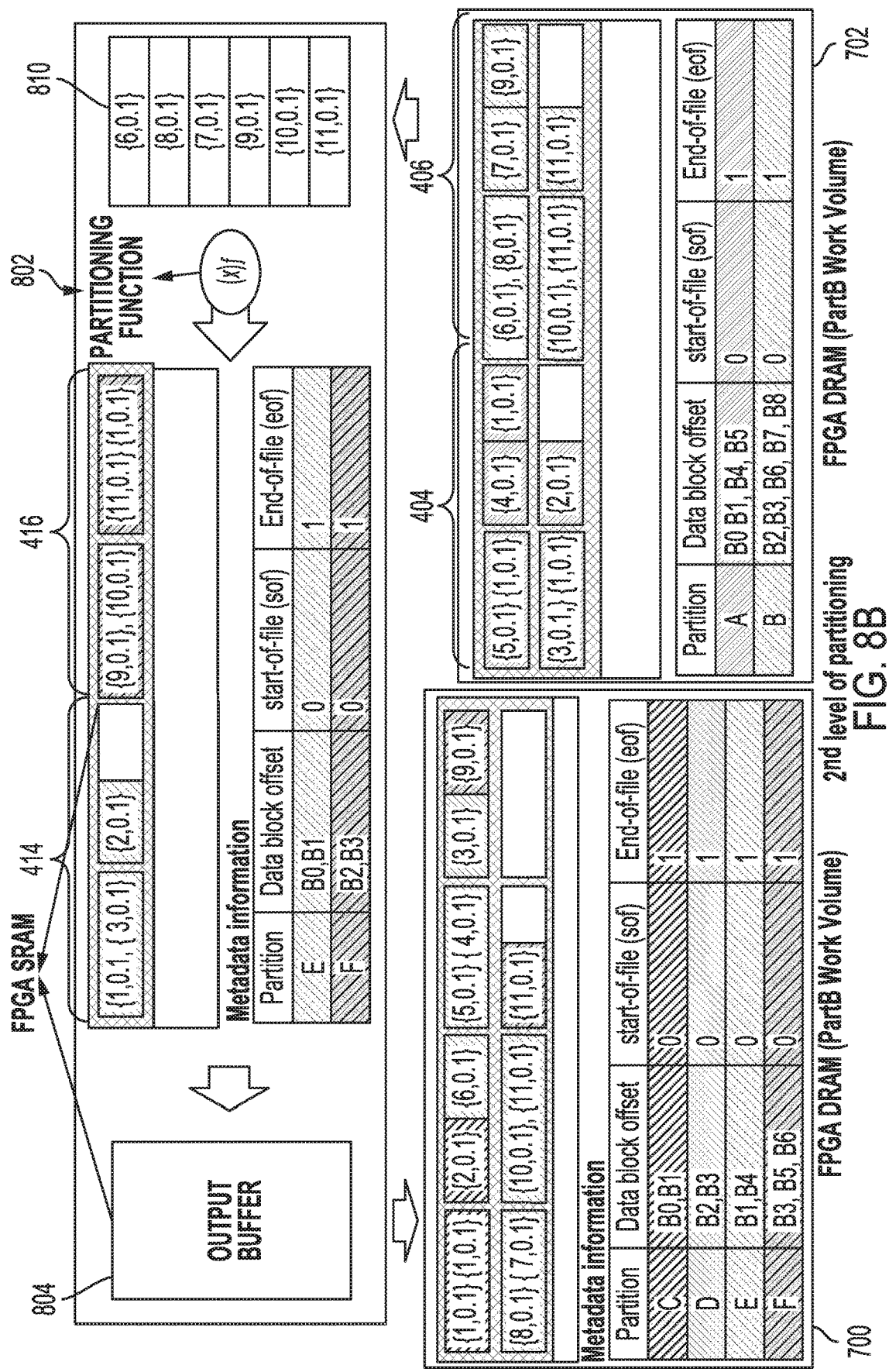

FIGS. 8A and 8B are conceptual layout diagrams of a process of using the two work volumes 700 and 702 in alternating manner to generate partitions at each level of partitioning, according to one exemplary embodiment. During the first level of partitioning as depicted in FIG. 8A, work volume 700 is the source work volume from which a batch 800 of source input data is loaded. A partitioning function dependent on the partition fan-out value P is run for generating P number of partitions (e.g. partition A 404 and partition B 406). The generated partitions are stored in an output buffer 804 of the on-chip memory 202, and loaded to work volume 702 of the off-chip storage device 208.

During the second level of partitioning as depicted in FIG. 8B, work volume 702 is the source work volume from which a batch 810 of source input data is loaded. The partition function is run for generating P number of partitions (e.g. partition E 414 and partition F 416). Partitions 414 and 416 are then stored in the output buffer 804 of the on-chip memory 202, and stored to work volume 700 of the off-chip storage device 208, in a way that maximizes data packing.

The low-locality data conversion methodology according to the various embodiments allow the conversion of large low-locality data into high-locality data (stored as partitions) in block level (e.g., NAND physical page size for an SSD), instead of the whole dataset, in superior time. Big data applications (e.g. graph processing applications) that suffer from random access patterns due to low-locality of data that they process may thus benefit via the transformation of the low-locality data into high-locality partitioned data. Further, the low-locality data conversion methodology may not require perfect sequentiality of the data. Instead, in one embodiment, SSD page-level locality is provided for random accesses to the storage. Available resources near the storage (such as FPGA) are exploited to coalesce the random and fine-grained accesses to the storage.

In one embodiment, the low-locality data conversion methodology provides a tree-like, recursive partitioning strategy that allows a much lower latency of on-chip storage (when compared to latency of off-chip storage), to be leveraged and maximized. For each successive level of partitioning (L), a single sequential sweep is made through the input data source to generate an exponent number of partitions ($P^L$). In one embodiment, many forms of random accesses to the off-chip memory devices can be avoided by the disclosed systems. Thus, performance of the system may be made dependent on off-chip (e.g. DRAM) bitwidth. In one embodiment, the off-chip storage devices experience sequential data access patterns. Such sequential access patterns can be more efficient than random access patterns due to higher bandwidth efficiency.

In one embodiment, data representation of sub-partitions on-chip allows the low-locality data conversion system to support a high number of P which translates to better performance. A high number of P translates to a shorter number of passes through the input data before T is finally generated.

In one embodiment, the data packing technique of off-chip storage allows space efficiency. At every level of partitioning, an additional exponent number of partitions are generated. Therefore, the data storage technique of the low-locality data conversion methodology allows the data to be tightly packed in storage, so that regardless of the value of NB (input batch size), L (current level of partitioning), or T (required target number of partitions), the same work volume sizes would be sufficient.

Figure 9:
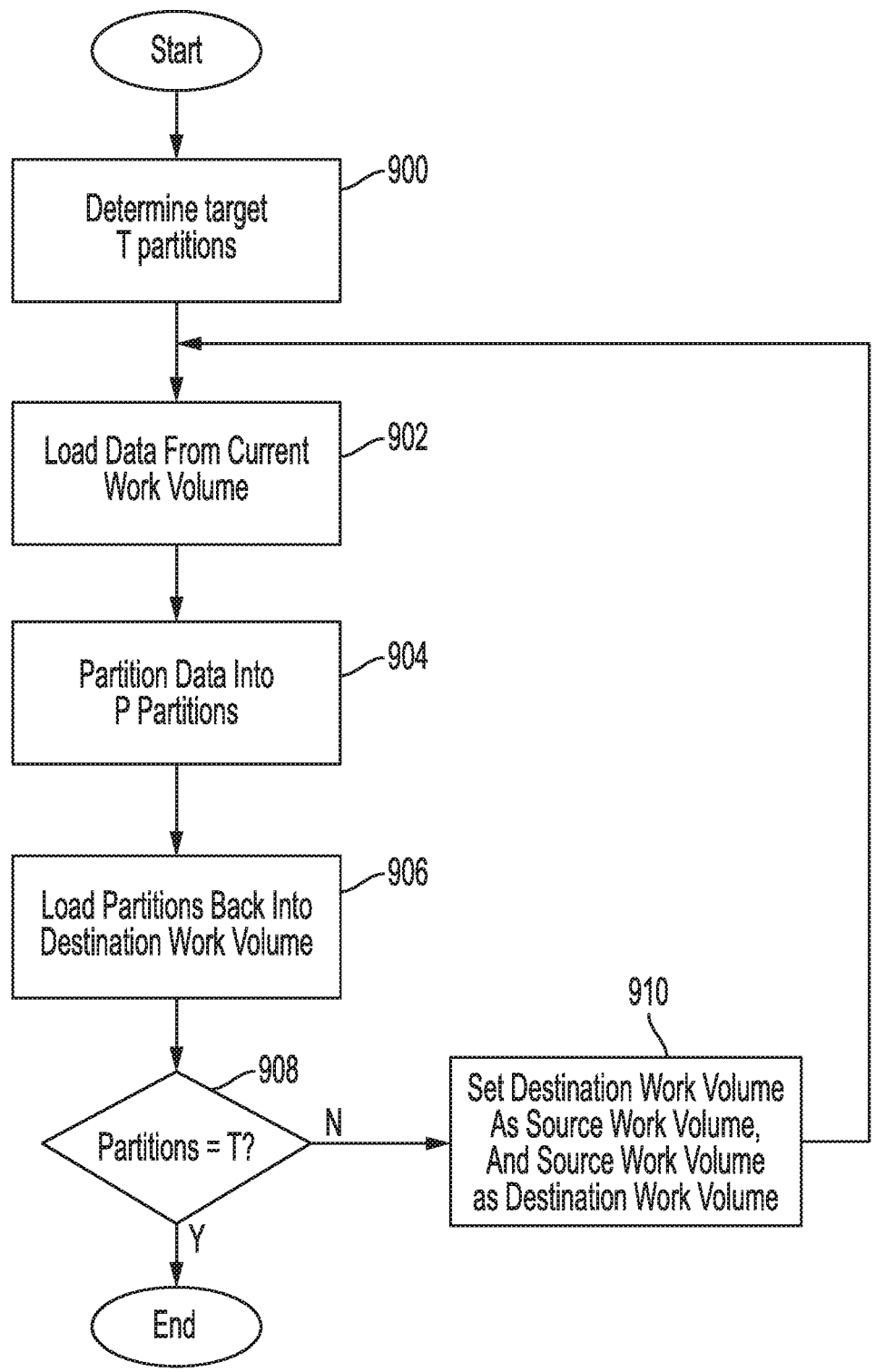
FIG. 9 is a flow diagram of a process for creating partitions using the two work volumes of FIG. 7 in an alternating manner, according to one exemplary embodiment.

FIG. 9 is a flow diagram of a process for creating partitions using work volumes 700 and 702 according to one exemplary embodiment. The process starts, and in act 900, the partitioning module 210 determines the target T number of partitions to be generated.

According to one embodiment, work volume 700 of the off-chip storage device 208 initially acts as the source work volume, and work volume 702 of the off-chip storage device initially acts as the destination work volume. In this regard, in act 902, the partitioning module 210 loads data from work volume 700, the current source work volume.

In act 904, the partitioning module 210 partitions data into P partitions.

In act 906, the partitioning module 210 loads the partitions back into the off-chip storage device, and saves the partitions into work volume 702, the current destination work volume.

In act 908, a determination is made as to whether the target T number of partitions have been created. If the answer is YES, the process ends, and the partitioned data in the current destination work volume may be accessed by the data computing module 212.

If the answer is NO, the partitioning module sets the current destination work volume (work volume 702) as the source work volume, and further sets the current source work volume (work volume 700) as the destination work volume. The acts of loading 902, partitioning 904, and loading back 906 are repeated until the target number of T partitions are generated.

In some embodiments, the modules described above, including the partitioning module 210 and data computation module 212, are implemented in one or more processing circuits. The term "processing circuit" as used herein can mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for converting low-locality data to high-locality data have been specifically described and illustrated herein, many modifications and variations will be apparent to those skilled in the art. Accordingly, it is to be understood that a system and method for knowledge distillation constructed according to principles of this disclosure may be embodied other than as specifically described herein. The disclosure is also defined in the following claims, and equivalents thereof.

What is claimed is:

1. A method for processing unstructured source data, the method comprising:
   determining a target number of T partitions;
   identifying the unstructured source data as input data for a first level of recursion;
   recursively generating partitions based on the input data until the target number of T partitions are generated, wherein the recursively generating includes:
      loading the input data from an off-chip storage device to an on-chip storage device, the input data having a range V;
      partitioning the input data into P temporary partitions via the on-chip storage device, wherein a particular one of the P temporary partitions has a range of V/P;
      storing the P temporary partitions from the on-chip storage device to the off-chip storage device; and
      identifying data in one of the P temporary partitions as the input data for a next level of recursion,
   wherein an application is configured to perform accesses of partitioned data from the T partitions for generating an output, wherein the accesses of the partitioned data are sequential read accesses of the off-chip storage device and wherein T, V, and P are numerical values greater than 1.

2. The method of claim 1, wherein T is based on a storage capacity of the on-chip storage device, wherein a range of the partitioned data in a particular one of the generated T partitions is within the storage capacity of the on-chip device.

3. The method of claim 2, wherein the input data for the first level of recursion has a range of R, wherein the range of the partitioned data in a particular one of the generated T partitions is R/T.

4. The method of claim 1, wherein the partitioned data has higher locality than locality of the input data.

5. The method of claim 1, wherein the loading of the input data is in batches via a sequential read operation of the off-chip storage device, and the storing of the P temporary partitions is via a sequential write operation of the off-chip storage device.

6. The method of claim 1, wherein fixed memory space is allocated in the off-chip storage device, wherein all partitions generated at a particular level of recursion are stored in the fixed memory space.

7. The method of claim 1, wherein during the first level of recursion of the recursive generating, the P temporary partitions are P temporary parent partitions, and during a second level of recursion of the recursive generating, the P temporary partitions are P temporary child partitions, wherein the storing of the P temporary child partitions during the second level of recursion includes invoking a data storage process including:
   dynamically allocating a data block of a fixed size, wherein the data block stores a portion of a first one of the P temporary child partitions from a first parent partition of the P temporary parent partitions, and a portion of a second one of the P temporary child partitions from a second parent partition of the P temporary parent partitions, for maximizing use of storage space of the data block.

8. The method of claim 1, wherein a portion of the partitioned data accessed from the off-chip storage device is stored on the on-chip storage device, the method further comprising:
   accessing the partitioned data on the on-chip storage device via a random data access.

9. The method of claim 1, wherein the on-chip storage device is a static random access memory, and the off-chip storage device is a dynamic random access memory or a solid state drive.

10. The method of claim 1, wherein the unstructured source data is graph data, and the application is a graph processing application.

11. A system for processing unstructured source data, the system comprising:
   an off-chip storage device;
   an on-chip storage device; and a processor coupled to the on-chip and off-chip storage devices, the processor being configured to:
    determine a target number of T partitions;
    identify the unstructured source data as input data for a first level of recursion;
    recursively generate partitions based on the input data until the target number of T partitions are generated, wherein the processor is configured to:
        load the input data from the off-chip storage device to the on-chip storage device, the input data having a range V;
        partition the input data into P temporary partitions via the on-chip storage device, wherein a particular one of the P temporary partitions has a range of V/P;
        store the P temporary partitions from the on-chip storage device to the off-chip storage device; and
        identify data in one of the P temporary partitions as the input data for a next level of recursion,
    wherein an application is configured to perform accesses of partitioned data from the T partitions for generating an output, wherein the accesses of the partitioned data are sequential read accesses of the off-chip storage device and wherein T, V, and P are numerical values greater than 1.

12. The system of claim 11, wherein T is based on a storage capacity of the on-chip storage device, wherein a range of the partitioned data in a particular one of the generated T partitions is within the storage capacity of the on-chip device.

13. The system of claim 11, wherein the input data for the first level of recursion has a range of R, wherein the range of the partitioned data in a particular one of the generated T partitions is R/T.

14. The system of claim 11, wherein the partitioned data has higher locality than locality of the input data.

15. The system of claim 11, wherein the loading of the input data is in batches via a sequential read operation of the off-chip storage device, and the storing of the P temporary partitions is via a sequential write operation of the off-chip storage device.

16. The system of claim 11, wherein fixed memory space is allocated in the off-chip storage device, wherein the processor is configured to store all partitions generated at a particular level of recursion using the fixed memory space.

17. The system of claim 11, wherein during the first level of recursion of the recursive generating, the P temporary partitions are P temporary parent partitions, and during a second level of recursion of the recursive generating, the P temporary partitions are P temporary child partitions, wherein the processor is configured to store the P temporary child partitions during the second level of recursion via a data storage process including:
    dynamically allocating a data block of a fixed size, wherein the data block stores a portion of a first one of the P temporary child partitions from a first parent partition of the P temporary parent partitions, and a portion of a second one of the P temporary child partitions from a second parent partition of the P temporary parent partitions, for maximizing use of storage space of the data block.

18. The system of claim 11, wherein the processor is configured to store a portion of the partitioned data accessed from the off-chip storage device on the on-chip storage device, the processor being further configured to:
    access the partitioned data on the on-chip storage device via a random data access.

19. The system of claim 11, wherein the on-chip storage device is a static random access memory, and the off-chip storage device is a dynamic random access memory or a solid state drive.

20. The system of claim 11, wherein the unstructured source data is graph data, and the application is a graph processing application.

* * * * *